United States Patent
Rothschild

(10) Patent No.: US 8,085,192 B2
(45) Date of Patent: Dec. 27, 2011

(54) DEVICE, SYSTEM AND METHOD FOR CONTROLLING AND STORING SENSITIVE INFORMATION ON A GPS DEVICE

(76) Inventor: Leigh M. Rothschild, Sunny Isles Beach, FL (US)

(*) Notice: Subject to any disclaimer, the term of this patent is extended or adjusted under 35 U.S.C. 154(b) by 31 days.

(21) Appl. No.: 12/753,963

(22) Filed: Apr. 5, 2010

(65) Prior Publication Data
US 2010/0198510 A1  Aug. 5, 2010

Related U.S. Application Data

(63) Continuation of application No. 11/220,233, filed on Sep. 6, 2005, now Pat. No. 7,692,580.

(51) Int. Cl.
G01S 19/03 (2010.01)
G01C 21/30 (2006.01)
(52) U.S. Cl. .................. 342/357.4; 701/209
(58) Field of Classification Search ............ 342/357.01–357.17, 357.4, 357.74; 701/209, 213
See application file for complete search history.

(56) References Cited

U.S. PATENT DOCUMENTS

| 5,748,147 | A  |    | 5/1998  | Bickley et al. |
|---|---|---|---|---|
| 6,359,570 | B1 | *  | 3/2002  | Adcox et al. .................. 340/902 |
| 6,490,521 | B2 | *  | 12/2002 | Wiener ......................... 701/211 |
| 6,710,741 | B2 |    | 3/2004  | Tucker |
| 7,117,075 | B1 | *  | 10/2006 | Larschan et al. ................ 701/35 |
| 2004/0010699 | A1 | * | 1/2004 | Shao et al. ..................... 713/189 |
| 2004/0178880 | A1 |   | 9/2004 | Meyer et al. |
| 2005/0037773 | A1 | * | 2/2005 | Holland et al. ............ 455/456.1 |
| 2006/0204047 | A1 |   | 9/2006 | Dave et al. |

* cited by examiner

Primary Examiner — Thomas Tarcza
Assistant Examiner — Nga X Nguyen
(74) Attorney, Agent, or Firm — Atanu Das; DaVine, IP

(57) ABSTRACT

A system and method for controlling and storing sensitive information on a global positioning system (GPS) device are provided. The system includes a locational information module for determining location information of the device; an encryption module for encrypting the location information; a processing module for storing the encrypted location information in a storage module; and an input module for inputting a code string for decrypting the location information. Information inputted to and/or generated by the device will be encrypted on the storage module. The storage module can be in any form currently available including optical media, or various types of removable memory cards or cartridges. Furthermore, the storage module may be internal memory and the GPS device may further include a transmission module or connection, e.g., hardwire or wireless, to port the information to a computer.

22 Claims, 3 Drawing Sheets

DEVICE, SYSTEM AND METHOD FOR CONTROLLING AND STORING SENSITIVE INFORMATION ON A GPS DEVICE

PRIORITY

The present application is a continuation application of U.S. patent application Ser. No. 11/220,233, filed Sep. 6, 2005, the contents of which are hereby incorporated by reference in their entirety.

BACKGROUND

1. Field

The present disclosure relates generally to navigational or positional information systems, and more particularly, to devices, systems and methods for controlling and storing sensitive information on a global positioning system (GPS) device.

2. Description of the Related Art

GPS (Global Positioning System) devices are everywhere. These devices provide a user with such information as latitude and longitude, accurate time, heading, velocity, etc. GPS devices are particularly useful in automobiles and other vehicles. Many individuals have multiple GPS devices if they own, for instance, two cars that both have the device. Conventionally, most devices will allow a user to store information such as address points in the internal memory of the device. Some devices will allow you to store this information on removable memory, e.g., memory cards, optical media, etc. In the latter case, this can be particularly helpful because a list of addresses, for instance, will be useful to be moved from GPS device (e.g., a first vehicle) to GPS device (e.g., a second vehicle).

However, GPS related information can be quite sensitive. For instance, most persons will store their home address in the device as well as the addresses of other contacts. This is not the kind of information that a person would want other unauthorized individuals to have access to.

In another example, many persons would desire to retain information on past trips (e.g., routes) that the vehicle has made. Typically, a GPS device is capable of storing information (e.g., in internal memory or on removable memory) regarding the time and location of the vehicle during usage. This information could prove quite useful for someone who wants to track the vehicles usage, for example, an employer wanting to see where a company car was driven during a particular day, or a parent who loans their child the car and wants to see where the car was taken. Again, the challenge here is to store this information in a form that can only be accessed by designated parties (for example, by the employer not the employee, and by the parent and not the child).

Therefore, a need exists for techniques for controlling and storing sensitive information on a GPS device and only allowing access to designated parties.

SUMMARY

A system and method of saving information on a global positioning system (GPS) device in a secure fashion which will only allow designated users access to the information and then transferring that information to a user's local computer are provided. The principles of the present disclosure apply to any global positioning system (GPS) device, e.g., hand-held, vehicle mounted, stand-alone GPS receiver coupled to a computer, etc. Information inputted to and/or generated by the GPS device will be encrypted on a storage module. The storage module can be in any form currently available including optical media, or various types of removable memory cards or cartridges including CompactFlash, SD memory, Memory Stick, etc. Furthermore, the storage module may be internal memory and the GPS device may further include a transmission module or connection, e.g., hardwire or wireless, to port the information to a computer.

According to one aspect of the present disclosure, a device is provided including a locational information module for determining location information of the device; an encryption module for encrypting the location information; and a processing module for storing the encrypted location information in a storage module. The device further includes an input module for inputting a code string for decrypting the location information, wherein the location information is at least one of traveled routes, a home address, destination addresses and velocity of the device at predetermined times.

In another aspect, the storage module is removable storage memory. The device may further include an interlock for preventing removal of the storage module.

In a further aspect, the storage module is internal storage memory and the device further includes a transmission module for transmitting the encrypted location information to a computing device.

According to another aspect of the present disclosure, a system for controlling and storing location information is provided. The system includes a device including a locational information module for determining location information of the device; an encryption module for encrypting the location information; and a processing module for storing the encrypted location information in a storage module; and a computer including a processor configured to execute a decryption program for decrypting the encrypted location information.

In still a further aspect of the present disclosure, a method for controlling and storing location information in a device includes determining location information of the device; encrypting the location information; and storing the encrypted location information in a storage module. The method further includes inputting a code string into the device for decrypting the location information.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

Figure 1:
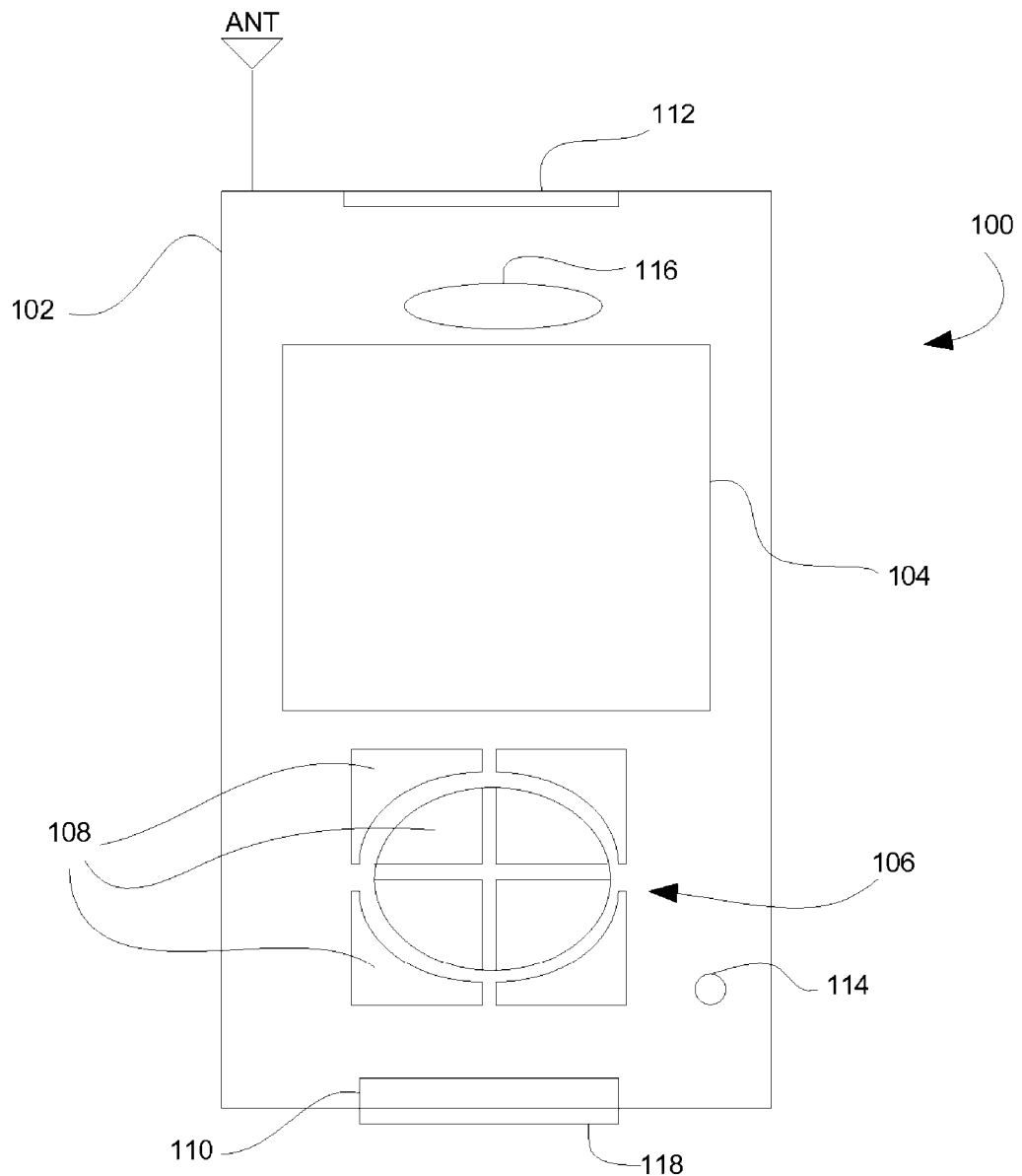
FIG. 1 is front view of a device for storing and controlling information according to an embodiment of the present disclosure.

Referring to FIG. 1, a global positioning system (GPS) device 100 for determining a location of a user in accordance with an embodiment of the present disclosure is illustrated.

Although the device shown and described in relation to FIG. 1 is a hand-held device, it is to be understood the principles of the present disclosure may be applied to any type of navigation or positional device including but not limited to a vehicle-mounted device, a GPS receiver coupled to a desktop computer or laptop, etc.

The GPS device 100 includes various electrical components, which will be described in detail below, disposed in a generally rectangular housing 102. A display module 104 is provided for displaying a location of a user, a map, coordinates, waypoints, frequently accessed addresses, personal information, etc. As will be described in more detail below, the display module 104 may include a touch screen for facilitating user input of information. Input module 106 includes a plurality of buttons 108 for inputting data and navigating through a plurality of menus and/or maps. The GPS device 100 further includes a storage module 110 for storing a plurality of maps, frequently used addresses, traveled routes, etc and a transmission module 112 for transmitting stored data to another device, e.g., a personal computer, a personal digital assistant (PDA), a server residing on the Internet, etc. Optionally, the device 100 may include a microphone 114 for acquiring audio from the user of the device to input data and a speaker 116 for audibly producing directions to a user.

Figure 2:
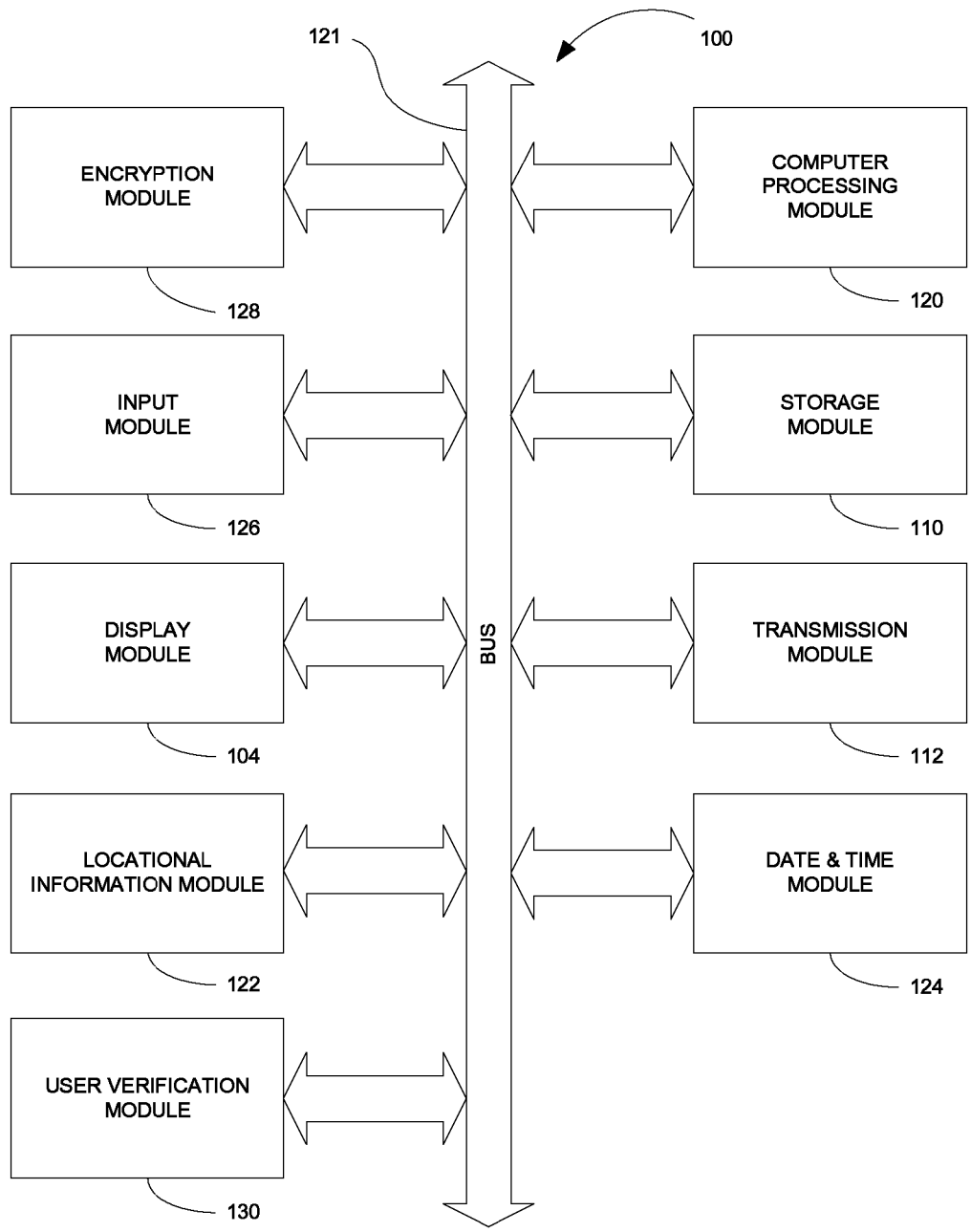
FIG. 2 is a block diagram of various modules included in the device illustrated in FIG. 1.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM). The various processes and functions described herein may either be part of the micro instruction code or part of an application program (or a combination thereof) which is executed via the operating system.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

A locational information module 122 will be provided for determining a location of the device 100 and/or user. The locational information module 122 may include a receiver and antenna ANT employing conventional locational information processing technology such as Global Positioning Satellite (GPS) Technology, Loran Technology, or any other available locational technology, to indicate the exact location, e.g., latitude, longitude and altitude, of the device 100. Exemplary GPS receivers and antennas are described in U.S. Pat. Nos. 5,654,718 and 6,775,612, the contents of both of which are herein incorporated by reference. It is to be appreciated that the latitude, longitude and altitude may be used to interact with maps stored in memory or in the storage module 110 of device 100 to determine the city, state or address of the location the device 100. Furthermore, the locational information module 122 may calculate routes traveled, velocity of a vehicle including the device 100, etc., or alternatively, may send the position coordinates to the processing module 120 at a predetermined sampling period where the processing module will perform the calculations.

Furthermore, the device 100 will include a date and time module 124. The date and time module 124 will use standard computer chip processing technology widely in use, or alternatively, input from locational information module 122, e.g., a GPS receiver, to supply the date and time. The date and time may be associated with routes traveled and may be employed to determine velocity of the user of the device 100 whether in a vehicle, on a bicycle or while walking.

The device 100 will also contain a display module 104 for displaying a location of a user, a map, coordinates, waypoints, frequently accessed addresses, etc. This display may be in any current form in the art, including Liquid Crystal Displays (LCD), Light emitting diode displays (LED), Cathode Ray Tube Displays (CRT) or any other type of display currently existing or existing in the future. The display module 104 may also include an audio output device 116, e.g., a speaker, headphone jack, etc., allowing the user to also hear audio output from the device 100, e.g., audibly producing directions to a desired location or predetermined address.

The device 100 of the present disclosure will contain a user input module 126 to either receive user instructions via text input by the way of buttons 108, a standard keyboard interface coupled to the device, or a character recognition capture device which translates user text input into alphanumeric characters. Preferably, the character recognition device is a touch screen which overlays the display module 104 and text is entered via a pen-like stylus. Such input devices are standard and currently available on many electronic devices including portable digital assistants (PDAs) and cellular telephones. Optionally, microphone 114 may be further coupled to the input module 126 for capturing any audio information spoken by the user and the input module will further include an analog-to-digital (A/D) converter for converting the spoken audio information into a digital format. Furthermore, the input module may include a voice recognition processor that translates the digital human voice into alpha numeric characters for user input. The user will utilize the user input module 126 to enter various data, for example, a plurality of destination addresses, waypoints, etc.

The storage module 110 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. The storage module 110 will store various types of information such as the inputted destination addresses, routes traveled by the user, the user's home address, etc.

The device 100 will also include an encryption module 128.

The encryption module 128 will use conventional code encryption algorithms currently in use or that will be in use in the future such as symmetric-key algorithms, e.g., DES, Triple-DES, Blowfish, RC2, RC4, RC5, etc., and asymmetric-key algorithms, e.g., Diffie-Hellman, RSA, ElGamal, etc. to encrypt the data information that comes into the user input module 126 and/or that is stored in the storage module 110. In one embodiment of the present disclosure, the encryption module 128 will always encrypt the data information, but in other embodiments, the user will select whether to encrypt the data or to leave the data unencrypted.

Upon initialization of device 100, processing module 120 prompts the user via display module 104 or speaker 116 to select a code string that the user wishes to use. The user selects an appropriate code string and enters the code string into the device 100 with input module 126 via buttons 108, microphone 114 or touch screen. The input module 126 sends the code string to the processing module 120 which in turn sends this string to encryption module 128. The encryption module 128 then uses this code string to encrypt (using standard encryption algorithms identified above) all addresses and route points (or just the addresses and route points that the user designates) and store this information in the storage module 110. When the GPS device 100 is inactive, all information in the storage module 110 is encrypted. When the GPS device 100 is active, the information in the storage module 110 is sent to the encryption module 128 which after receiving the user's code string decrypts the information, and then sends the information to the processing module 120 where it can then be presented to the user on the display module 104.

Also note that in another embodiment, the GPS device 100 can function so that the information written to the storage module 110 can only be accessed by a user by inputting the code string. In other words, if the user or another party wants to view past route information on trips taken, or a list of addresses stored, the user must supply the code string to the encryption module 128 which will then use the processing module 120 to decrypt the information and present that information on the display module 104 of the GPS device 100. This code string could be user designated to be required each time information is requested, or alternatively, automatically every time the GPS device 100 is turned on.

In another embodiment of the present disclosure, the GPS device 100 will include a hardware interlock 118 to prevent the removal of the storage module 110. The interlock 118 may be a detent configured to engaged a memory card being employed, a mechanical door which prevents access to the storage module 110, or a mechanism which physical rejects the storage module 110. In this embodiment, the user would submit the code string to the encryption module 128 via the input module 126 which would then accept the code string and instruct the processing module 120 to unlock the hardware interlock 118 and allow user removal of the storage module 110. If the code string is not accepted, the storage module 110 will not be able to be removed.

In another embodiment, the device 100 will further include a user verification module (UVM) 130. The user verification module 130 will indicate and verify the identity of the user of the device 100. The user verification module 130 may execute a password protection algorithm or may include an identity capture device, either incorporated into the device 100 or coupled externally via a cable. The identity capture device may be a biometric device, such as a retinal scanning device, finger print reader, facial recognition reader or another type of user identity verification input device which will collect information on the user to be compared to information that has previously been stored in the device's memory. One such exemplary fingerprint reader is the BioTouch™ fingerprint reader commercially available from Identix Incorporated of Minnetonka, Minn. It is to be noted that identity detection devices such as biometric devices are common and are currently widely in use. It is to be further noted, that identity verification devices that are not yet in use such as DNA detection, etc, would also be compatible with device 100. In this embodiment, the identity of the user may be required in addition to the entering of a code string to decrypt information on the storage module 110. In a further embodiment, the identity of a particular user may be linked to their code string and, upon verification of the identity of a user, the linked code string will be submitted to the encryption module 128. In another embodiment, the identity of the user may be required to unlock the interlock 118.

According to the various techniques described above, any information inputted to and/or generated by the GPS device 100 will be securely stored in the storage module 110 whether the type of storage is internal or removable. Only users with an appropriate code string will be granted access to the sensitive information stored in the device 100, e.g., their home address, contact lists, whereabouts of particular individuals, etc.

Figure 3:
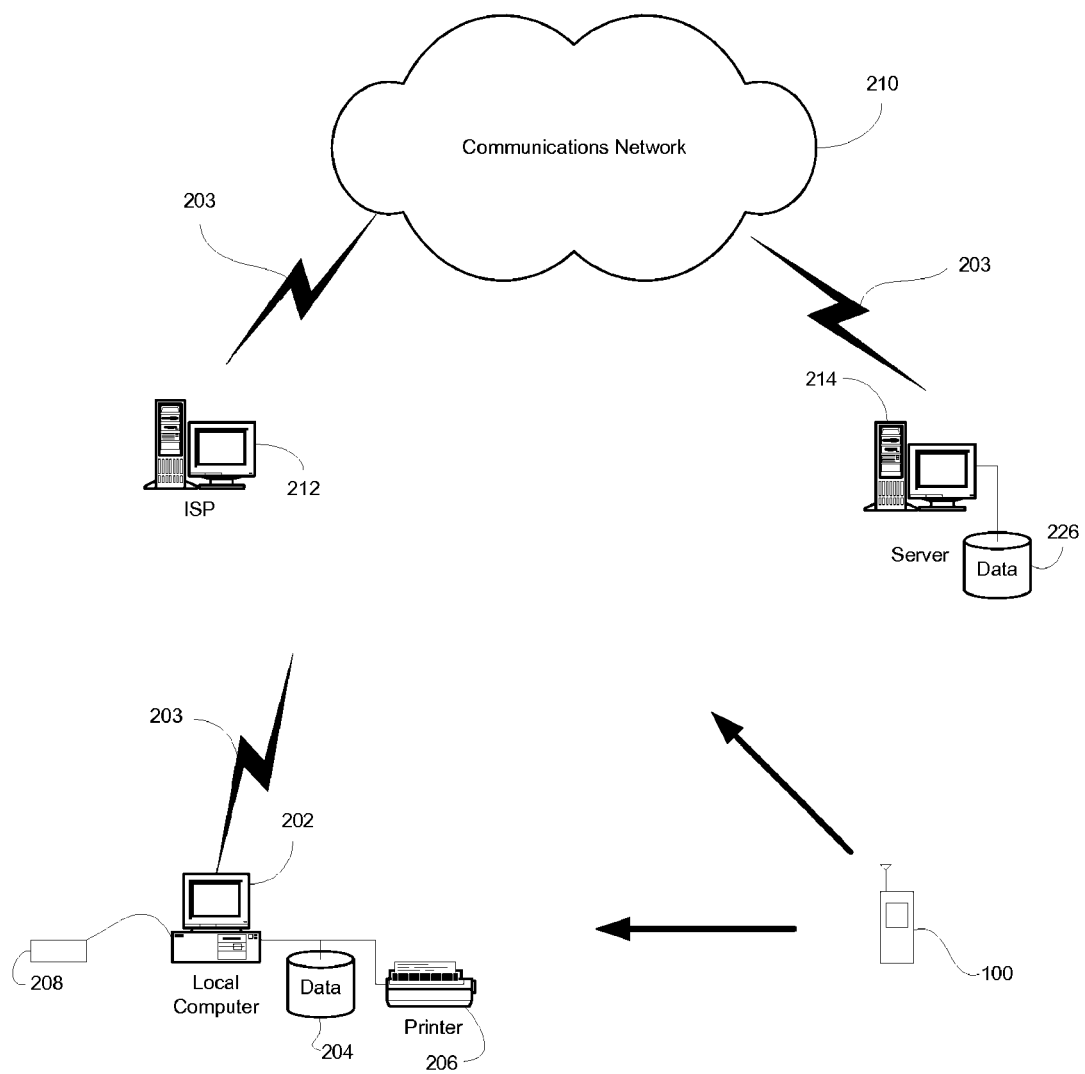
FIG. 3 is a diagram of an exemplary system for storing and controlling information in a GPS system in accordance with an embodiment of the present disclosure.

In another embodiment, the encrypted information stored in the storage module 110 may be transferred to a user's local computer for further processing as shown in FIG. 3. The user's local computer 202 will include a reader 208 for reading information from the storage module 110. It is to be appreciated that the reader 208 may take any form to ensure compatibility with the type of storage module 110 used, for example, reader 208 may be a CD reader, DVD reader, memory card reader, etc. or a combination of readers as are commonly found on conventional computers. If the information is stored in internal memory instead of removable memory, the transfer will be done by transmission module 112 including hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), or any other type of communication protocols or systems currently existing or to be developed for wirelessly transmitting data. The transmission module will compress and encode the encrypted information for transmission using any known wireless communication technology.

The user's local computer 202 may be connected to communications network 210, e.g., the Internet, by any known means, for example, a hardwired or wireless connection 203. It is to be appreciated that the network 210 may be a local area network (LAN), wide area network (WAN), the Internet or any known network that couples a plurality of computers to enable various modes of communication via network messages. Alternatively, the user's local computer 202 may connect to the network 210 via an Internet Service Provider (ISP) 212, where once connected, the ISP server 212 will manage the flow of data to other users of the network 210 and/or manage the flow of information from various web sites connected to the network 210, e.g., content providers residing on servers 214. The computing devices shown in FIG. 3 may communicate to the network 210 via any known communication link 203, for example, dial-up, hardwired, cable, DSL, satellite, cellular, PCS, wireless transmission (e.g., 802.11a/b/g), etc. Furthermore, the devices will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

The user will receive a small code (decryption) program (CEP) from the manufacturer of the device 100 when the user purchases the GPS device 100. The CEP program may be distributed on optical media, or other computer media, or may also be downloaded from a website on a server 214 that the manufacturer provides to the user. Such encryption/decryption programs are standard in the industry and include such programs as PGP (Pretty Good Privacy). The user would load the CEP program into his local computer 202. The user would then insert the storage module 110 from the GPS device 100 into the reader 208 of their computer, or alternatively, transfer the contents of the storage module 110 via the transmission module 112. The user would provide the computer 202 with the code string that the user used with the GPS device 100. This information would then be transferred to a processor of the computer 202 that will execute the CEP program which would then verify the code string as correct and, if correct, allow the processor of the user's computer 202 to decrypt the information from the storage module. Once the information is decrypted, the user may view the information on a display of the computer 202 or print out a hard copy of the information on a printer 206 coupled to the computer 202.

In the case of routing information, and in a preferred embodiment, the GPS manufacturer may also tie in a mapping program that the user may store in memory 204 of the local computer 202 or may access via the server 214. The mapping program would take the route or address information and overlay it on a geographic map to show, for instance, the exact route that the vehicle took or the exact location of the stored address points for a certain time period.

It is to be appreciated that when the CEP decrypts the information from the storage module, it does so in the local memory of the user's computer 202 or in storage memory of the computer 202 and not on the storage module 110. Thus, the information stays encrypted on the storage module 110. Of course, if desired, the user could erase any of the information on the storage module 110 by using the local computer's reader 208 to write to the storage module 110 and erase the information.

When the user is finished viewing the information from the storage module 110, the user would insert the storage module 110 (still encrypted) back into the GPS device 100 so that the device 100 is again ready to use.

A device, system and method for controlling and storing location information have been described. By encrypting information stored on a GPS device, a user can be confident that their sensitive information such as their home address, personal contacts and addresses, etc. can not be accessed by other users of the device or by a unknown user in the case where the GPS device is lost. By encrypting the information on a removable storage module, a user can check the traveled routes or velocity of a vehicle containing the device on a local computer without the user of the vehicle tampering with the information. This may be particularly useful for a parent verifying the destinations visited by a child or for an employer verifying the whereabouts of their employee(s).

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A location information device with secure data storage comprising:
    a housing;
    a locational information module for determining location information of the device, the determined location information being at least one route traveled by the device;
    an encryption module for encrypting the determined location information;
    a removable storage module for storing the encrypted location information, the removable storage module being removably disposed in the housing; and
    a processing module for sending the encrypted location information to the removable storage module removably disposed in the housing and retrieving the encrypted location information from the removable storage module.

2. The device as in claim 1, further comprising an input module disposed on the housing configured for receiving a code string input by a user, wherein the user inputted code string is used for encrypting and decrypting the location information stored in the removable storage module.

3. The device as in claim 1, further comprising a user verification module for verifying the identity of user of the device, wherein the processing module selectively decrypts the location information stored in the removable storage module based on the identity of the user.

4. The device as in claim 3, wherein the user verification module executes a password protection algorithm for verifying the identity of the user of the device.

5. The device as in claim 3, wherein the user verification module further comprises an identity capture device for verifying the identity of the user of the device.

6. The device as in claim 5, wherein the identity capture device is a biometric device.

7. The device as in claim 5, wherein the identity capture device is a retinal scanning device.

8. The device as in claim 5, wherein the identity capture device is a finger print reader.

9. The device as in claim 5, wherein the identity capture device is a facial recognition reader.

10. The device as in claim 5, wherein the identity capture device is a DNA detection device.

11. The device as in claim 1, wherein the location information further includes at least one of a home address, destination addresses and velocity of the device at predetermined times.

12. The device as in claim 1, further comprising a transmission module for transmitting the encrypted location information to an external computing device.

13. A location information device with secure data storage comprising:
    a housing;
    a locational information module for determining location information of the device, the determined location information being at least one route traveled by the device;
    an encryption module for encrypting the determined location information;
    a storage module for storing the encrypted location information; and
    a processing module for sending the encrypted location information to the storage module and retrieving the encrypted location information from the storage module.

14. The device as in claim 13, further comprising a transmission module for transmitting the encrypted location information from the storage module to an external computing device.

15. The device as in claim 14, further comprising an input module disposed on the housing configured for receiving a code string input by a user, wherein he user inputted code string is used for encrypting and decrypted the location information stored in the storage module.

16. The device as in claim 14, further comprising a user verification module for verifying the identity of user of the device, wherein the processing module selectively decrypts the location information stored in the storage module based on the identity of the user.

17. The device as in claim 16, wherein he user verification module executes a password protection algorithm for verifying the identity of the user of the device.

18. The device as in claim 16, wherein the user verification module further comprising an identity capture device for verifying the identity of the user of the device.

19. A system for controlling and storing location information comprising:
 a location information device with secure data storage comprising:
  a housing;
  a locational information module for determining location information of the location information device, the determined location information being at least one route traveled by the location information device;
  an encryption module for encrypting the determined location information;
  a removable storage module for storing the encrypted location information, the removable storage module being removably disposed in the housing; and
  a processing module for sending the encrypted location information to the removable storage module removably disposed in the housing and retrieving the encrypted location information form the removable storage module; and
 a computing device comprising:
  a reader configured for reading the removable storage module of the location information device when he removable storage module s removably disposed in the reader; and
  a processor configured to execute a decryption program for decrypting the encrypted location information on the removable storage module removably disposed in the reader.

20. The system as in claim 19, wherein the location information further includes at least one of a home address, destination addresses and velocity of the device at predetermined times.

21. The system as in claim 19, wherein the computing device further comprises a memory for storing a plurality of geographical maps and the processor is configured to overlay the location information on at least one of the plurality of geographical maps.

22. A system for controlling and storing location information comprising:
 a location information device with secure data storage comprising:
  a housing;
  locational information module for determining location information of the location information device, the determined location information being at least one route traveled by the location information device;
  an encryption module for encrypting the determined location information;
  a storage module for storing the encrypted location information;
  a processing module for sending the encrypted location information to the storage module and retrieving the encrypted location information from the storage module; and
  a transmission module for transmitting the encrypted location information from the storage module to an external computing device; and
 the external computing device comprising:
  a connectivity device configured for receiving the encrypted location information form the location information device; and
  a processor configured to execute a decryption program for decrypting the encrypted location information received from the location information device.

* * * * *